United States Patent
Quentin

(10) Patent No.: US 11,620,631 B2
(45) Date of Patent: Apr. 4, 2023

(54) METHOD FOR TRANSMITTING DATA TO A MAGNETIC READING HEAD, METHOD FOR PROCESSING RECEIVED DATA, CORRESPONDING PAYMENT TERMINAL AND PROGRAM

(71) Applicant: INGENICO GROUP, Paris (FR)

(72) Inventor: Pierre Quentin, Enghien les Bains (FR)

(73) Assignee: INGENICO GROUP, Paris (FR)

( * ) Notice: Subject to any disclaimer, the term of this patent is extended or adjusted under 35 U.S.C. 154(b) by 318 days.

(21) Appl. No.: 16/622,021

(22) PCT Filed: Jun. 12, 2018

(86) PCT No.: PCT/EP2018/065551
§ 371 (c)(1),
(2) Date: Dec. 12, 2019

(87) PCT Pub. No.: WO2018/229075
PCT Pub. Date: Dec. 20, 2018

(65) Prior Publication Data
US 2020/0234284 A1   Jul. 23, 2020

(30) Foreign Application Priority Data

Jun. 13, 2017   (FR) ...................... 1755309

(51) Int. Cl.
*G06Q 20/32* (2012.01)
*G06K 19/06* (2006.01)
(Continued)

(52) U.S. Cl.
CPC ... *G06Q 20/3278* (2013.01); *G06K 19/06206* (2013.01); *G06Q 20/3674* (2013.01); *G06Q 30/0233* (2013.01)

(58) Field of Classification Search
CPC .......... G06Q 20/3674; G06Q 20/3278; G06Q 30/0233; G06K 19/06206
See application file for complete search history.

(56) References Cited

U.S. PATENT DOCUMENTS 8,439,274 B2 *   5/2013   Chenot .............. G06Q 20/3572
                                                    235/487
8,939,357 B1 *   1/2015   Perry .................. G06Q 20/387
                                                    235/379
(Continued)

FOREIGN PATENT DOCUMENTS

WO       2010022129 A1        2/2010
WO       WO-2011005848 A2 *   1/2011   .......... G06K 19/041
WO       2016110591 A1        7/2016

OTHER PUBLICATIONS

D. Choi and Y. Lee, "Eavesdropping of Magnetic Secure Transmission Signals and Its Security Implications for a Mobile Payment Protocol," in IEEE Access, vol. 6, pp. 42687-42701, 2018, doi: 10.1109/ACCESS.2018.2859447. (Year: 2018).*

(Continued)

*Primary Examiner* — James M Detweiler
*Assistant Examiner* — Monica A Mandel
(74) *Attorney, Agent, or Firm* — David D. Brush; Westman, Champlin & Koehler, P.A.

(57) ABSTRACT

A method for the transmission of data to a magnetic read head of a payment terminal. The method is implemented by an electronic device capable of generating a magnetic field representative of an encoding of the data to be transmitted, and the transmission of the data includes a plurality of emissions of a same sequence of standardized data. The standardized data is data representative of a payment means and is formatted according to the ISO/IEC 7813 standard. The method further includes transmitting secondary data (Continued)

that are emitted between two successive emissions of the sequence of standardized data.

9 Claims, 2 Drawing Sheets

(51) Int. Cl.
    *G06Q 30/02*     (2012.01)
    *G06Q 20/36*     (2012.01)
    *G06Q 30/0226*     (2023.01)

(56) References Cited

U.S. PATENT DOCUMENTS

| | | |
|---|---|---|
| 9,224,141 B1 | 12/2015 | Lamba et al. |
| 10,579,920 B2 * | 3/2020 | Mullen ............ G06Q 30/0222 |
| 2006/0022033 A1 | 2/2006 | Smets et al. |
| 2009/0159669 A1 * | 6/2009 | Mullen ............ G06K 19/0775 |
| | | 235/493 |
| 2011/0006122 A1 * | 1/2011 | Chenot ............ G07F 7/10 |
| | | 235/493 |
| 2012/0074232 A1 | 3/2012 | Spodak et al. |
| 2013/0320080 A1 | 12/2013 | Olson et al. |
| 2015/0069126 A1 * | 3/2015 | Leon ............ G06K 19/06206 |
| | | 235/492 |
| 2015/0081447 A1 * | 3/2015 | Sarkissian ............ G06Q 20/356 |
| | | 705/17 |
| 2016/0162883 A1 | 6/2016 | Liscia et al. |
| 2017/0017938 A1 * | 1/2017 | Lee ............ G06Q 20/3572 |

OTHER PUBLICATIONS

International Preliminary Report on Patentability dated Dec. 5, 2019 for corresponding International Application No. PCT/EP2018/065551, filed Jun. 12, 2018.

International Search Report dated Jul. 27, 2018 for corresponding International Application No. PCT/EP2018/065551, filed Jun. 12, 2018.

Written Opinion of the International Searching Authority dated Jul. 27, 2018 for corresponding International Application No. PCT/EP2018/065551, filed Jun. 12, 2018.

European Notification under Article 94 (3) dated Dec. 13, 2021 for parallel European Application No. 18731413.3.

* cited by examiner

METHOD FOR TRANSMITTING DATA TO A MAGNETIC READING HEAD, METHOD FOR PROCESSING RECEIVED DATA, CORRESPONDING PAYMENT TERMINAL AND PROGRAM

CROSS-REFERENCE TO RELATED APPLICATIONS

This Application is a Section 371 National Stage Application of International Application No. PCT/EP2018/065551, filed Jun. 12, 2018, which is incorporated by reference in its entirety and published as WO 2018/229075 A1 on Dec. 20, 2018, not in English.

1. FIELD OF THE INVENTION

The present invention relates to the field of payment operations. An objective of the invention is more particularly a method for transmitting secondary data to a magnetic read head of a payment terminal, as a complement to main data representative of a payment means. The invention also relates to a method for processing received data, implemented by a payment terminal.

2. PRIOR ART

Most payment cards comprise a magnetic stripe, generally situated on the back of the card, that contains data related to the payment card. Such magnetic stripe payment cards are generally credit cards, debit cards, gift cards or again promotion cards. The data relating to the payment card (for example a bank account number, a holder's name, an expiry date etc.) are recorded on the magnetic stripe in alternating the orientation of magnetic particles integrated into the stripe. These data are generally transmitted to a payment terminal by swiping the card into a magnetic stripe reader of the payment terminal. Such a reader comprises especially at least one magnetic read head and an associated decoding circuit. When the card is swiped into the magnetic stripe reader, the magnetic stripe of the card moves before the read head. This mobile magnetic stripe, which contains magnetic domains of alternating polarity, then generates a magnetic field in the narrow detection aperture of the read head. The read head converts this magnetic field into an equivalent electrical signal. The decoding circuit amplifies and digitizes this electrical signal, and this enables the recreation of the same sequence of data as the one originally recorded on the magnetic stripe. The encoding of the magnetic stripe of a payment card is described in the international standards ISO/IEC 7811 and 7813.

The growing popularity and capacities of smartphones have encouraged manufacturers to propose payment solutions using these communications terminals. However, one of the main obstacles to the adoption of these payment solutions has been the lack of a channel for transferring data between such communications terminals and the payment terminals deployed at sales points. For example, although many smartphones today incorporate Near Field Communications (NFC) functions with the aim especially of providing the user with contactless payment solutions, many payment terminals are not yet compatible with such contactless payment technology. The user then has no choice but to keep the traditional payment card on his person in addition to his smartphone in order to be sure of being able to carry out a payment operation under any circumstance.

Various solutions have been proposed to circumvent these problems of incompatibility with the aim of ensuring maximum compatibility with the fleet of payment terminals currently deployed in the world. In a recent solution, a user's mobile communications terminal (typically his smartphone) is provided with a data-emitting device comprising especially a coil capable of generating a magnetic field similar to the field generated by the magnetic stripe of a payment card during its passage into the magnetic stripe reader of an electronic payment terminal. Such a data-emitting device, described for example in the document WO 2016/007475, can get connected for example to the audio connector of the smartphone. Other solutions, which rely on the same general principle but do not require any additional coupling of the device to the smartphone, have also been described. These solutions rely on the use of a coil already present in the smartphone (for example the coil used for the induction charging of certain smartphones) to generate a fluctuating magnetic field of this kind. Thus, it becomes possible to carry out a contactless payment operation using a smartphone implementing such a technology if the payment terminal used for the payment operation is provided with a magnetic stripe card reader (which is the case for a very large majority of electronic payment terminals). It is enough for the user to bring his smartphone sufficiently close to the payment terminal for the read head to pick up the fluctuations of the magnetic field emitted by the smartphone (or by the device connected thereto). From the viewpoint of the payment terminal, everything then happens as if a magnetic stripe payment card had been passed into its magnetic stripe reader. This technique therefore makes it possible to creates a contactless data transfer channel between a smartphone and a payment terminal for the transmission of data related to a payment card pre-stored in the smartphone, in order to carry out a payment operation. This solution is therefore aimed at simplifying the performance of payment operations for the user: these operations can indeed be carried out simply and speedily with a limited number of handling operations, using a communications terminal in his possession.

Nevertheless, in practice, in an increasingly frequent number of payment operations, the user needs to provide complementary information in addition to information related to his payment means. This is especially the case when the user is a member of a loyalty program and wishes for example to obtain an immediate reduction on a purchase that he is in the process of making, or again wishes to accumulate loyalty points associated with the purchasing operation to subsequently obtain an advantage as a reward for his loyalty. In this case, the user must provide the merchant with additional information to identify him within the loyalty program. This additional information—or secondary data—is for example provided in the form of a bar code that is to be scanned by the merchant. Such a bar code can especially be recorded in a physical loyalty card (the user must then take this card out of his wallet to present it to the merchant) or again it can be displayed on the screen of the user's smartphone by means of a dedicated application (the user must then open this application and select the loyalty card to be displayed). The result of this is that the advantages procured by the previously described payment solution—enabling the emulation, by means of an electronic device such as a smartphone, of the passage of a magnetic stripe payment card into the reader of a payment terminal—are largely annihilated by the handing operations and the time needed besides to transmit secondary data that are accessory to payment.

There is therefore a need for methods to transmit and process secondary data on the margins of a payment operation that do not have at least some of the drawbacks described here above.

3. SUMMARY

The proposed technique does not have these drawbacks of the prior art. More particularly, according to one aspect, the proposed technique relates to a method for the transmission of data to a magnetic read head of a payment terminal, this method being implemented by an electronic device capable of generating a magnetic field representative of an encoding of said data. The transmission of data comprises a plurality of emissions of a same sequence of standardized data, said standardized data being data representing a payment means and being formatted according to the international ISO/IEC 7813 standard. According to this method, the transmission of data furthermore comprises the transmission of secondary data, emitted between two successive emissions of said sequence of standardized data.

Thus, the proposed method of transmission makes it possible to use the operation for transmitting data representative of a payment means (the standardized data) to a payment terminal in order to also transmit secondary data that is intended for example to confirm, augment or complement a payment operation. In this way, the transmission of data pertaining to the payment means and the transmission of secondary data are no longer dissociated: these pieces of information are transmitted by one and the same communications channel in one single operation, via the generation of a magnetic field capable of being picked up by the magnetic read head of a payment terminal. Since the secondary data are furthermore transmitted between successive emissions of standardized data, they do not disturb a classic reception of these standardized data by the payment terminal. The compatibility of the solution with any type of payment terminal, even terminals that do not enable the processing of secondary data, is therefore ensured.

According to one particular embodiment, said secondary data comprise at least one piece of data representing a bank authentication token.

Thus, the secondary data offer the possibility of validating a payment operation, at a payment terminal, in enabling a verification of the authenticity of the standardized data representative of a payment means.

According to yet another particular embodiment, said secondary data comprise at least one loyalty program identifier.

Thus, the proposed technique enables the transmission of data that establishes the user's membership in a loyalty program, simultaneously with data representative of a payment means that make it possible to finalize a payment operation being processed. The providing of these secondary data to the payment terminal enables the terminal to process the data in order to advantageously complement the payment operation (for example in order to obtain a reduction or to credit loyalty points to a loyalty account). In this way, the providing of this information to the merchant does not require additional handling operations that are time consuming for the user (for example he does not need to search in his wallet for a loyalty card to be presented to the merchant).

According to another aspect, the proposed technique also relates to a method for processing data received by a magnetic read head of a payment terminal. Such a method, implemented within the payment terminal, comprises:

- a step for identifying, within a data stream received at said read head, at least two successive sequences of standardized data, said standardized data being data representing a payment means and being formatted according to the ISO/IEC 7813 standard;
- a step for determining a presence, within said received data stream, of data, called secondary data, comprised between two successive sequences of standardized data among said at least two preliminarily identified successive sequences of standardized data; and when the step for determining a presence delivers a positive result:
- a step for obtaining said secondary data;
- a step for processing said secondary data obtained.

Thus, the presence of secondary data within a data stream received by a payment terminal can be detected, and these secondary data can be retrieved at the same time as standardized data representing a payment means, to carry out a processing operation linked with or on the margins of the performance of a payment operation.

According to one particular embodiment, the processing operation implemented in said step for processing secondary data is a function of a type of said secondary data.

Thus, it is possible to differentiate between the processing operations to be carried out on the secondary data as a function of the type of secondary data retrieved within the data stream received by the payment terminal.

According to one particular embodiment, said processing step comprises, when the secondary data take the form of at least one authentication token:

- a step for carrying out a cryptographic computation on the basis of said standardized data;
- a step for comparing a result of the cryptographic computation with said at least one authentication token, delivering a piece of information on authenticity of said standardized data.

Thus, the payment terminal has the possibility of implementing a cryptographic computation, the result of which is compared with an authentication token comprised in the secondary data received, in order to verify the authenticity of the standardized data representative of a payment means. If necessary, the payment terminal can thus block a payment operation if the result of the cryptographic computation is not consistent with the authentication token (the payment data provided could then have been obtained fraudulently).

According to another particular embodiment, said step for processing comprises, when the secondary data take the form of at least one loyalty program identifier, a step of transmission of said at least one loyalty program identifier to a loyalty program management server.

Thus, the payment terminal is capable of simultaneously managing the performance of a payment operation (by means of standardized data) and the associated aspects of loyalty retention (using secondary data which for example identify the user with a loyalty program management server).

According to one particular embodiment, the step for identifying sequences of standardized data comprises at least one identification of a standardized data sequence start sentinel and a standardized data sequence end sentinel.

Thus, the detection of well identified sentinels within the data stream received by the payment terminal facilitates the retrieval of sequences of standardized data but also the retrieval of secondary data which may or may not be comprised between these sequences.

According to one particular embodiment, said step for determining a presence of secondary data comprises:

a step for the reading, within the received data stream, of a predetermined number of characters, situated immediately after said standardized data sequence end sentinel in said received data stream, delivering a sequence of characters;

a step for comparing said sequence of characters with at least one piece of reference data, delivering a reference indicator of said secondary data in case of a positive comparison.

The reference indicator can especially act as a presence indicator. Thus, the detection of a particular sequence of characters after the standardized data sequence end sentinel informs the payment terminal that secondary data are present in the data stream and that the payment terminal can read and process these secondary data.

According to one particular embodiment, said step for comparing the sequence of characters with at least one piece of reference data comprises the comparison of this sequence of characters with a plurality of reference data representative of types of secondary data.

The reference indicator can especially act as an indicator of the type of secondary data, as a complement to or an alternative to its presence indicator function. Thus, this indicator makes it possible to know the type of secondary data even before having received them, in order to carry out a subsequent, accordingly adapted processing of this secondary data.

According to yet another particular embodiment, the method for processing data further comprises:

a step for obtaining said at least two consecutive identified sequences of standardized data;

a step for comparing said at least two sequences of standardized data delivering a piece of control information.

In this way, the piece of control information can be used to verify the fact that the standardized data received have not been altered during the transmission of the data (it is unlikely that the same error transmission of data occurs twice in succession during the transmission of a sequence of standardized data).

According to one preferred implementation, the different steps of the methods according to the proposed technique are implemented by one or more computer software programs comprising software instructions intended for execution by a data processor of a relay component according to the proposed technique and designed to command the execution of the different steps of the methods.

The proposed technique is therefore also aimed at providing a program liable to be executed by a computer or by a data processor, this program comprising instructions to command the execution of the steps of a method as mentioned here above.

This program can use any programming language whatsoever and can be in the form of source code, object code or intermediate code between source code and object code such as in a partially compiled form or in any other desirable form whatsoever The proposed technique is also aimed at providing a recording medium or information medium readable by a data processor, and comprising instructions of a computer program as mentioned here above.

The recording medium mentioned here above can be any entity or communications terminal whatsoever capable of storing the program. For example, the medium can comprise a storage means such as a ROM, for example, a CD ROM or microelectronic circuit ROM or again a magnetic recording means, for example a floppy disk or a hard disk drive.

Besides, the recording media can be a transmissible medium such as an electrical or optical signal, that can be conveyed via an electrical or optical cable, by radio or by other means. The programs according to the invention can especially be uploaded to an Internet type network.

As an alternative, the information medium can correspond to an integrated circuit into which the program is incorporated, the circuit being adapted to executing or to being used in the execution of the method in question.

According to one embodiment, the proposed technique is implemented by means of software and/or hardware components. In this respect, the term "component" can correspond, in this document, equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, gateway, router etc.) and is liable to access the hardware resources of this physical entity (memories, recording media, communications buses, electronic input/output boards, user interfaces, etc.).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

Each component of the system described here above naturally implements its own software components.

According to another aspect, the proposed technique also relates to a payment terminal having a magnetic read head, and comprising:

means for identifying, within a data stream received at said read head, at least two successive sequences of standardized data, said standardized data being data representative of a payment means and being formatted according to the ISO/IEC 7813 standard;

means for determining a presence, within said received data stream, of data called secondary data comprised between two successive sequences of standardized data among said at least two preliminarily identified successive sequences of standardized data;

means for obtaining said secondary data;

means for processing said obtained secondary data.

According to yet another aspect, the proposed technique relates to a signal emitted in the form of a magnetic field by an electronic device. According to the invention, such a signal comprises a plurality of alternations of a same sequence of standardized data and same secondary data, said standardized data being data representative of a payment means and being formatted according to the ISO/IEC 7813 standard.

According to one particular embodiment, said sequence of standardized data comprises, in addition to a standardized data sequence start sentinel followed by main data and terminated by a standardized data sequence end sentinel, a piece of presence data representative of the presence and/or of the type of said secondary data within said signal. Such a piece of data on presence is situated immediately after said standardized data sequence end sentinel.

The different embodiments mentioned here above can be combined with one another to implement the proposed technique.

4. DRAWINGS

Other features and advantages mentioned shall appear more clearly from the following description of a preferred embodiment, given by way of a simple, illustrative and non-exhaustive example and from the appended figures of which:

FIG. 1a presents the general structure of a data stream transmitted from an electronic device to a magnetic read head of a payment terminal, according to one prior art technique;

FIG. 1b presents the general structure of a data stream transmitted from an electronic device to a magnetic read head of a payment terminal, according to the general principle of the invention;

Figure 4:
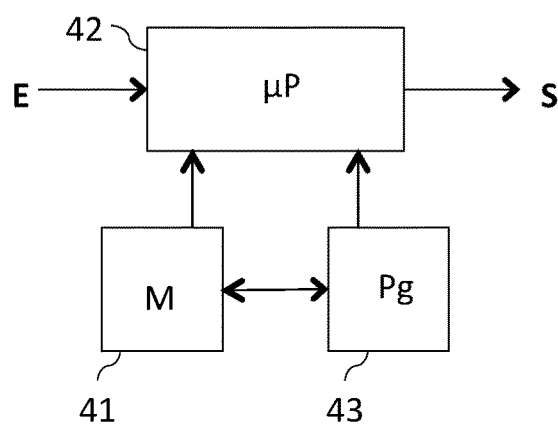
Figure 5:
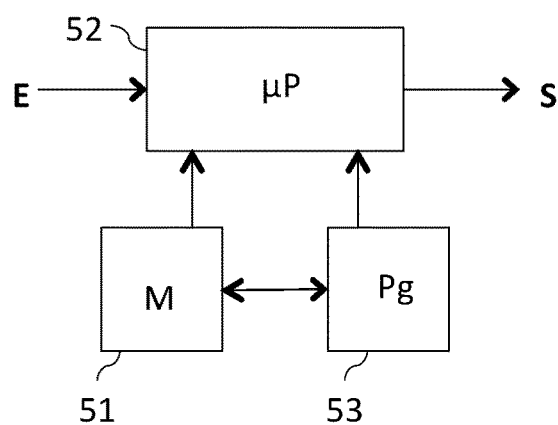

FIG. 4 describes a simplified architecture of an electronic device to implement a method for the transmission of data to a magnetic read head in one particular embodiment;

FIG. 5 describes a simplified architecture of a payment terminal in one particular embodiment.

5. DESCRIPTION

5.1. General Principle

The general principle of the invention consists in ingeniously exploiting certain possibilities offered by the above-described technique of emulation, by an electronic device, of the magnetic field generated by a magnetic stripe card, with the goal of removing certain present-day constraints related to the performance of payment operations. More specifically, the invention proposes to benefit from the operation of transmission of data representative of a means of payment for the transmission to a payment terminal of secondary data intended for example to confirm, augment or complement the payment operation performed. For example, with the proposed technique, when a user carries out a payment operation involving a commercial brand name in order to purchase an item or a service, secondary data on the user's membership in a loyalty program of this brand name are transmitted to the payment terminal at the same time as the information on the user's payment card. In other words, the transmission of data relative to the payment means on the one hand and the transmission of secondary data on the other hand is no longer done in two phases but in one single phase: the number of handling operations required for the user and for the merchant is reduced and both gain time. This goal is achieved by the insertion of the secondary data into the data stream comprising the main data related to the payment means, in a particular manner that is the subject of the present technique and is described in detail here below.

To begin with, it is necessary to recall a few pieces of information needed for the understanding of the invention.

On a classic magnetic stripe payment card, the data on the payment card—which are therefore data representative of a payment means—are recorded on a magnetic stripe according to a particular formal procedure defined in the context of the international ISO/IEC 7813 standard. The magnetic stripe of the payment card can especially comprise up to three tracks (numbered 1 to 3), each of these tracks having a predetermined number of pieces of information on the payment card, the data recorded on each track being structured in a precise way. This method thus ensures the compatibility of the payment card with a large number of payment terminals (it suffices that a payment terminal be capable of reading at least one of the tracks for the payment operation to be capable of being performed). It is not necessary, in the context of the present invention, to give a more detailed description of the particular formal procedure proper to each track. However, it must be noted that all the tracks share one and the same general structure, namely:

- a start sentinel;
- data called main data within the context of the present invention, which comprise data related to the payment card (account number also called a Primary Account Number or PAN, expiry date, etc.);
- an end sentinel;
- a longitudinal redundancy check character (also called an LCR character).

All these data therefore form standardized data, in that they respond to the formal structure described in the ISO/IEC 7813 standard. The main data are situated between the start sentinel and the end sentinel and the longitudinal redundancy check character is situated immediately after the end sentinel. The start and end sentinels are well-determined characters used to demarcate the data on the payment card and therefore to facilitate their retrieval in the payment terminal. These start and end sentinels are different, and this has the advantage of enabling the payment terminal to determine the sense in which a magnetic stripe payment card has passed into its reader (and if necessary to reverse the order of data received, if it turns out that the end sentinel is detected before the start sentinel). The longitudinal redundancy check character is the result of a computation made on the basis of the previous data, especially main data. This character is used in order to detect possible transmission errors that could occur during the reading of the data from the card magnetic stripe by the magnetic read head of the payment terminal. When a payment terminal receives data, it is supposed, by itself, to compute a longitudinal redundancy check character relative to the data received, and compare this computed character with the longitudinal redundancy check character received from the magnetic stripe card. When a difference is detected, the data have probably been corrupted during transmission.

When a magnetic stripe bank card is used to carry out a payment operation, the card is physically slid, throughout its length, into a slot of a magnetic stripe card reader, so that the magnetic stripe is totally read by at least one magnetic read head with which it is in a facing position during the movement of the card in the slot. The slot therefore acts as a guide and a single passage of the card into the reader slot is normally required so that the data recorded on the magnetic stripe are read accurately and totally when the movement is done at reasonable speed. In the technique implemented in the context of the present invention, the passage of a magnetic stripe card into the slot of the reader of the payment terminal is replaced by the action of positioning an electronic device in proximity to such a slot, and therefore in proximity to a read head capable of picking up the magnetic field fluctuations generated by the electronic device. The slot no longer acts as a guidance means and various parameters can then influence the efficient reading of the data in the payment terminal: these parameters may be the orientation or the distance of the electronic device relative to the payment terminal, or again the instant at which the electronic device is brought close to the payment terminal. It is therefore preferable, at the level of the electronic device, to cyclically send out standardized data representative of a payment means, so as to enable for example the user to adjust the position of the electronic device relative to the payment terminal until these standardized data are accurately received by the payment terminal.

Figure 1A:
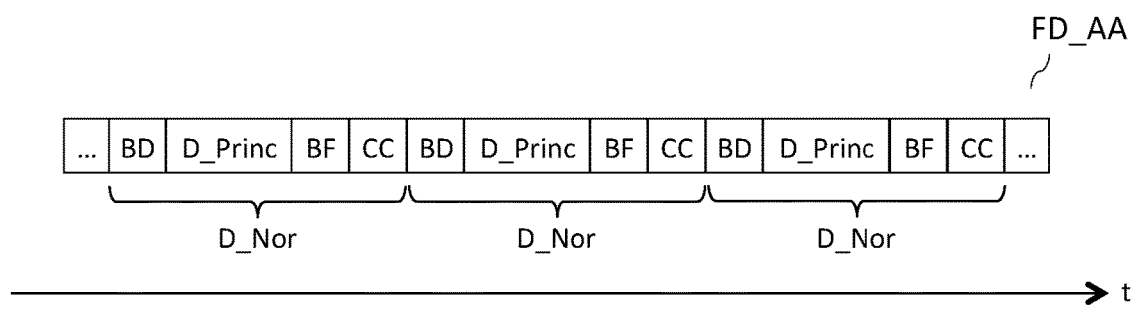

This is especially illustrated with FIG. 1a which presents a data stream FD_AA sent out in the form of fluctuations of a magnetic field by an electronic device, according to the principle of emulation of the magnetic field created by a magnetic stripe card already described with reference to the prior art. The method of data transmission implemented in this electronic device thus comprises a plurality of emissions of a same sequence of standardized data D_Nor, said standardized data being data representative of a payment means and being formatted according to the ISO/IEC 7813 standard as described here above. These data comprise therefore a start sentinel BD, then main data D_Princ, followed by an end sentinel BF, and finally a longitudinal redundancy check character CC. This repeated emission of standardized data D_Nor significantly increases the chances that these data will be accurately received via a payment terminal to which the electronic device is brought closer.

Figure 1B:
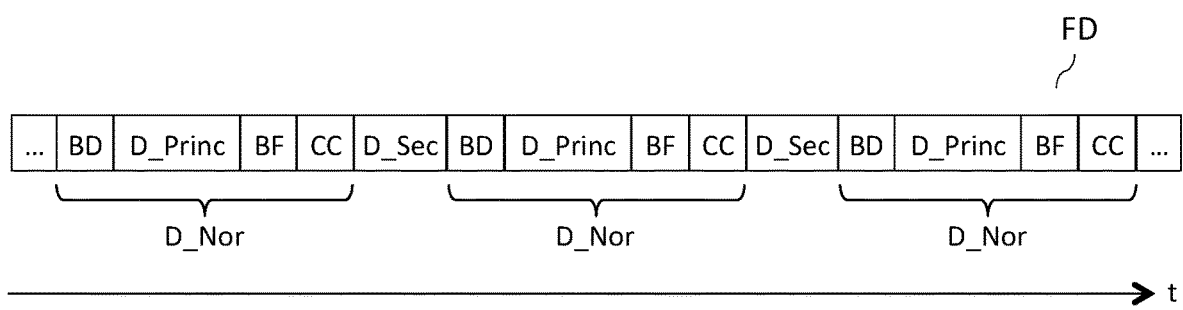

Referring now to FIG. 1b, we describe a data stream FD sent out in the form of fluctuations of a magnetic field by an electronic device, according to the general principle of the present invention. This data stream FD is distinguished from the data stream FD_AA of the prior art in that it comprises the transmission of secondary data D_Sec, emitted between two successive emissions of the sequence of standardized data D_Nor. The fact that the data transmitted are no longer the data recorded on the medium that is the magnetic stripe of a payment card but data inserted into a data stream built at the level of an electronic device, as a function of the circumstances of a payment operation, indeed enables the insertion of secondary data D_Sec into such a stream. These secondary data D_Sec are thus transmitted at the same time as the standardized data D_Nor to the payment terminal. The secondary data D_Sec are however ingeniously inserted between the end sentinel BF of a current sequence of standardized data and the start sentinel BD of a following sequence of standardized data, so that the reading, by the payment terminal, of a sequence of standardized data is not disturbed by these secondary data D_Sec. More particularly, according to a particular characteristic, the secondary data D_Sec are inserted after the end sentinel BF of a current sequence of standardized data, just after a number of characters corresponding to the length of the longitudinal redundancy check data (generally one character), and they extend up to the start sentinel BD of the following sequence of standardized data. We thus ensure a compatibility of the solution with the existing payment terminals already deployed, while at the same time enabling the implementation of new payment terminals for the processing of these secondary data in addition to the standardized data.

5.2. Data Transmission Method

According to a first aspect, the proposed technique therefore relates to a method for the transmission of data to a magnetic read head of a payment terminal. This method is implemented by an electronic device capable of generating a magnetic field representative of an encoding of said data. As already presented with reference to the prior art, such an electronic device can for example be a smartphone or tablet type communications terminal, an autonomous dedicated electronic device or again an electronic device intended to be coupled with a communications terminal (the electronic device can then for example be integrated into a protective shell or casing of the communications terminal).

Figure 2:
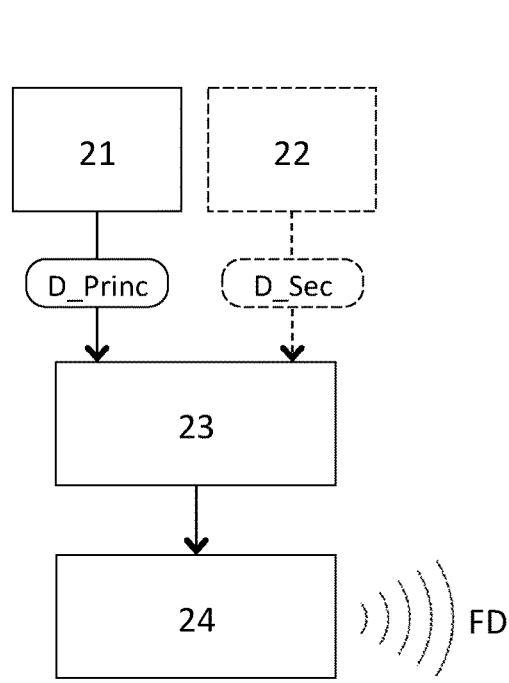
FIG. 2 illustrates the main steps of a method of data transmission implemented in an electronic device, in one particular embodiment of the invention.

FIG. 2 describes the main steps of such a method of data transmission in one particular embodiment. This method comprises a step 21 for obtaining main data D_Princ, which are data relative to a payment means, for example a personal account number (PAN), a holder's name or a date of expiry of a payment card. The method also comprises a step 22 for obtaining secondary data D_Sec. In a step 23 for building data to be transmitted, the main data D_Princ and the secondary data D_Sec are organized and structured so as to form the basic pattern which will be repeated cyclically in the data stream FD emitted. In particular, the main data D_Princ are formatted in compliance with the ISO/IEC 7813 standard, thus delivering a sequence of standardized data D_Nor. The method finally comprises a step 24 for transmitting a data stream FD comprising the repeated emission of the preliminarily built basic pattern in the form of a fluctuating magnetic field.

In one particular embodiment, the main data D_Princ and the secondary data D_Sec are obtained within a secured element of the electronic device. If the electronic device is not an autonomous device, but a device intended to be coupled to a communications terminal, the data are, as the case may be, obtained within a secured element of the communications terminal. These data have for example been preliminarily furnished by the user into a dedicated application installed in the electronic device or in the communications terminal. Such an application can especially be an electronic wallet type application that especially enables the storage of information associated with several cards as well as complementary information. Through this application, the user has the possibility of choosing the payment information and the secondary data to be used for a payment operation on a case-by-case basis. He also has the possibility of configuring pieces of payment information known as "default" information and secondary data known as "default" data which are data used by default in the context of a payment operation (in the absence of any other particular choice made by the user).

According to different embodiments of the method of transmission proposed, the secondary data D_Sec transmitted can comprise at least one bank authentication token and/or at least one loyalty program identifier. The advantages that lie in transmitting secondary data of this type are presented here below, with reference to the description of different embodiments pertaining to the data-processing method implemented in the payment terminal which receives the data stream FD.

5.3. Data-Processing Method

Figure 3:
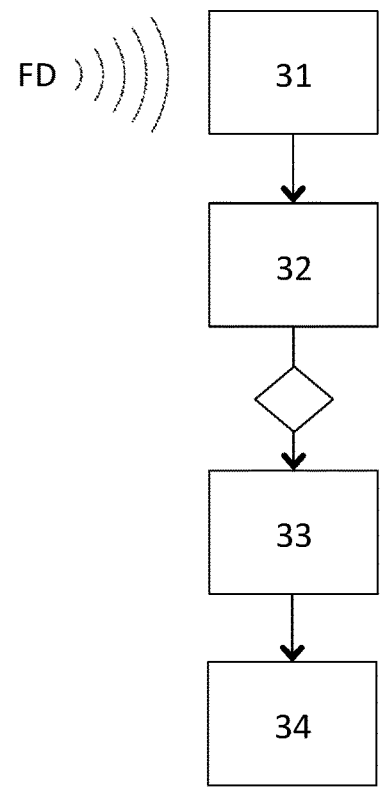
FIG. 3 illustrates the main steps of a method for processing data received by a magnetic read head of a payment terminal, in one particular embodiment of the invention.

The proposed technique also relates to a method for processing data received by a magnetic read head of a payment terminal. This method, implemented by the payment terminal, is described with reference to FIG. 3 in one particular embodiment.

In a step of identification 31, the payment terminal identifies at least two successive sequences of standardized data D_Nor within a data stream FD received at its magnetic read head. The standardized data D_Nor are data representative of a payment means and are formatted according to the ISO/IEC 7813 standard, and hence the identification of these standardized data D_Nor can be based on the identification of standardized data sequence start sentinels BD and standardized data sequence end sentinels BF.

The payment terminal then implements a determining step 32, in which it determines whether particular data, called secondary data, are present within the received data stream. Such secondary data D_Sec are data included between two successive sequences of standardized data D_Nor among the preliminarily identified successive sequences of standardized data. This step 32 for determining a presence of secondary data can be implemented in different ways. In one particular embodiment, the payment terminal starts listening to data comprised between the longitudinal redundancy check character—the length of which is known, and for which it is known that it is situated immediately after the end sentinel BF of a sequence of standardized data in the received data stream, making its detection possible—and the start sentinel BD of the following sequence of standardized data within the stream. For example, as soon as the payment terminal detects that it has received a longitudinal redundancy check character (which it deduces after detection of the reception of an end sentinel BF), it stores, in a buffer memory, the data received which arrive as and when the stream FD is received, until it detects the reception of a start sentinel BD of the next sequence of standardized data. If such data exist, then they are secondary data D_Sec on which the payment terminal can try to carry out a processing operation. In another particular embodiment, the character situated immediately after the standardized data end sentinel is ingeniously diverted from its primary function of longitudinal redundancy check character to serve as a marker of presence and/or of type of secondary data. Indeed, unlike the data recorded on the magnetic stripe of a payment card, the data stream is built and transmitted by the electronic emission device and its content can be adapted to meet particular circumstances of payment operations. This means that it is possible to replace the longitudinal redundancy check character by a specific character appropriate to the needs of a payment operation in progress, within the transmitted data stream. Ideally, this specific character has the same length as the longitudinal redundancy check character to remain compliant with the format described in the ISO/IEC 7813 standard. In this case, the determination step 32 comprises a step for the reading, within the received data stream, of a predetermined number of characters situated immediately after the end sentinel of a sequence of standardized data in the received data stream, delivering a sequence of characters (this predetermined number of characters corresponds to the length of the longitudinal redundancy check data, i.e. generally an alphanumeric character, or a byte or eight bits). The sequence of characters is then compared with at least one piece of reference data to deliver a reference indicator in the event of a positive comparison.

This reference indicator can especially be an indicator representing a presence of secondary data. Thus, the detection of a particular sequence of characters after the standardized data sequence end sentinel informs the payment terminal that secondary data are present in the data stream and that the payment terminal can read and process these secondary data.

According to one particular characteristic, the sequence of characters is compared with several reference data, each piece of reference data being representative of a type of secondary data. Thus, the payment terminal is capable of being informed, even before having received them, that the following data of the stream are secondary data. The payment terminal also knows their type and is therefore capable of adapting the processing of this secondary data accordingly.

If the payment terminal detects the presence of secondary data during the determining step 32, it retrieves them in the obtaining step 33 (for example within a buffer memory) and then it implements a processing step 34 for processing these secondary data.

In one particular embodiment, the processing performed at step 34 differs according to the type of secondary data obtained within the data stream received by the magnetic read head. According to one particular characteristic, the type of secondary data can be deduced from the format of the secondary data. In this case, it is necessary to have already retrieved the secondary data in order to be able to identify their type. As an alternative, the type of secondary data can be determined by the payment terminal even before having received the secondary data in question, for example through the insertion, within the standardized data of the data stream, of an appropriate specific character in place of a longitudinal redundancy check character, as described here above.

In one particular embodiment, the data-processing method also comprises a step for obtaining at least two preliminarily identified consecutive sequences of standardized data, and a step of mutual comparison of these sequences of standardized data, delivering a piece of check information. This check information especially makes it possible to ascertain that the standardized data received have not been corrupted during the transmission of the data from the electronic device to the payment terminal. Indeed, it is improbable that the same transmission error would occur twice in succession during the transmission of a sequence of standardized data. Thus, when at least two consecutively received sequences of standardized data are identical (at least with regard to the main data included between the start sentinel and the end sentinel), it can be considered that these data have not been corrupted during the transmission. Thus, the replacement of the longitudinal redundancy check character by a specific character acting as an indicator of the presence and/or of a type of secondary data, as proposed in one particular embodiment, is not a problem or issue: the proposed solution also offers another means of checking that the data received in the payment terminal are truly compliant with the data that have been transmitted by the electronic device. It can be noted that this same strategy can also be applied to the secondary data to make sure that they have not been corrupted during transmission, in another particular embodiment.

We now briefly present two examples of processing of secondary data, differentiated according to their type.

EXAMPLE 1: "Authentication Token" Type of Secondary Data

In one particular embodiment, the secondary data take the form a bank data authentication token. The processing step 34 then comprises the performance, by the payment terminal, of a cryptographic computation on the basis of the standardized data received, and then the comparison of the result of this computation with said at least one authentication token received in the form of secondary data. Such a comparison makes it possible for example to make sure of the authenticity of the bank data transmitted, or again to make sure that they are not used to carry out payment from an unknown electronic device, which would mean that they could have been obtained fraudulently. If the comparison proves to be negative, i.e. if the result of the cryptographic computation is different from the authentication token, the data pertaining to the payment means are rejected, and the payment operation is cancelled.

According to one particular characteristic, the authentication token is provided by a secured element of the electronic sending device or of a communications terminal to which it is connected and/or by a secured third-party application such as a bank application. In the particular embodiment associated with the example that has just been described, the secondary data are therefore used in order to validate or invalidate a payment operation, thus making it possible to heighten the security of a payment made by this type of technique, which is not possible with the prior art techniques.

EXAMPLE 2: "Loyalty Program Identifier" Type of Secondary Data

In another particular embodiment, the secondary data take the form of a loyalty program identifier. The processing step 34 then comprises the transmission, by the payment terminal, of this loyalty program identifier to a loyalty program management server. The user making the payment operation can thus be identified (within a data structure of the loyalty program management server for example) and benefit from the advantages provided to him by his membership in the loyalty program (obtaining a reduction automatically applied to the amount to be paid, addition of loyalty points to a loyalty account, etc.). This operation is relatively transparent both for the user and for the merchant: the loyalty program identifier is transmitted to the payment terminal at the same time as the data pertaining to the payment means and the user does not need to present a loyalty card. Nor does the merchant have to scan the bar code associated with such a loyalty card. The result of this is savings in time for all the parties, and therefore an increase in the number of payment processing operations that can be carried out by an operator (a cash desk operator for example). According to one particular characteristic, the loyalty program identifier transmitted as secondary data is a unique loyalty program identifier, which an intermediate server can use to retrieve a specific loyalty program identifier of the user for use in the context of a given payment operation. In the particular embodiment associated with the example that has been described, the secondary data are therefore used in order to complement or augment a payment operation.

5.4. Other Characteristics and Advantages

Referring to FIG. 4, we describe an electronic device comprising means for the execution of the data transmission method described here above, in one particular embodiment. Such an electronic device comprises:

- means for obtaining main data D_Princ, relating to a payment means, such as an account number (PAN), a holder's name, and/or an expiry date of a payment card;
- means for obtaining secondary data D_Sec;
- means for building data to be transmitted, as a function of of the main data D_Princ and the secondary data D_Sec, said building means being especially capable of formatting the main data D_Princ in compliance with the ISO/IEC 7813 standard to deliver standardized data D_Nor, and to organize and structure the standardized data D_Nor and the secondary data D_Sec so as to form a basic pattern of a data stream to be sent out;
- means of transmission of said data to be transmitted, in the form of a data stream comprising a plurality of alternations of a same sequence of standardized data and secondary data, by modulation of a magnetic field.

For example, the electronic transmission device comprises a memory 41 constituted by a buffer memory, a processing unit 42, equipped for example with a microprocessor and driven by the computer program 43, implementing especially a method of data transmission by modulation of a magnetic field. At initialization, the computer program code instructions 43 are for example loaded into a memory and then executed by the processor of the processing unit 42. The processing unit 42 inputs for example at input E at least one request for the transmission of data needed for performing a payment operation. The microprocessor of the processing unit 42 then implements the steps of the method of transmission according to the computer program instructions 43 so as to retrieve main data relative to a payment card and secondary data intended for the confirmation, augmentation or completion of the payment operation, and so as to structure this data to generate, at output S, a modulation of a magnetic field emitted by a coil of the electronic device. The modulation of the magnetic field is possibly preceded by an encoding of the data to be transmitted.

To this end, the electronic device comprises, in addition to the buffer memory 31, communications means such as network communications components, a data transmission component and if, if necessary, a dedicated encryption processor.

All these means can take the form of a particular processor implemented within the device, said processor being a secured processor, capable of processing confidential data, such as data on payment means or bank authentication tokens. According to one particular embodiment, this electronic device implements a particular application which is in charge of the performance of the encryption and transmission of data, this application being for example provided by the manufacture of the processor in question in order to enable the use of said processor. To this end, the processor comprises unique identification means. These unique identification means ensure the authenticity of the processor.

The proposed technique also relates to a payment terminal integrating a magnetic read head and comprising means for the execution of the data-processing method described here above. Such a payment terminal is especially described with reference to FIG. 5 in one particular embodiment, and it comprises:

- means for identifying, within a stream of data received at the read head, at least two successive sequences of standardized data, said standardized data being data representing a payment means and being formatted according to the ISO/IEC 7813 standard;
- means for determining a presence, within the received data stream, of data called secondary data comprised between two successive sequences of standardized data among said at least two preliminarily identified successive sequences of standardized data;
- means for obtaining said secondary data;
- means for processing said secondary data obtained.

For example, the payment terminal comprises a memory 51 constituted by a buffer memory, a processing unit 52, equipped for example with a microprocessor and driven by the computer program 53, implementing especially a data-processing method for the processing of data received at the magnetic read head of the payment terminal. At initialization, the computer program code instructions 53 are for example loaded into a memory and then executed by the processor of the processing unit 52. The processing unit 52 inputs at input E at least one instruction of an initialization of a payment operation. The microprocessor of the processing unit 52 then implements the steps of the processing method according to the instruction of the computer program 53. It listens to data received at the magnetic read head of the payment terminal so as to identify, within the received stream, sequences of standardized data representative of a payment means and so as to determine the presence, if any, of secondary data between two sequences of standardized data. In the event of a positive determination, the secondary data are obtained and processed and the result of this processing is notified at output S.

To this end, the payment terminal comprises, in addition to the buffer memory 41, data transmission/reception means which can take the form of a connection interface to one or more communications networks, these means making it possible, if necessary, to set up a link with partner servers for the management of loyalty programs. The payment terminal also comprises, if necessary, means of cryptographic computation, enabling it to verify the authenticity of data representative of payment means received on the basis of a comparison of the result of a cryptographic computation with an authentication token.

According to another aspect, the proposed technique also relates to a signal sent out in the form of a magnetic field by an electronic device. The signal in question comprises a plurality of alternations of a same sequence of standardized data and of same secondary data, the standardized data being data representative of a payment means, and being formatted according to the ISO/IEC 7813 standard. Thus, the sequence of standardized data comprises a standardized data sequence start sentinel BD followed by main data D_Pr and terminated by a standardized data sequence end sentinel BF. According to one particular characteristic, the sequence of standardized data further comprises, immediately after the standardized data sequence end sentinel BF, a piece of presence data representative of the presence of secondary data within said signal. This piece of presence data is for example encoded on one character. In this way, complementary data is transmitted while complying with the formal structure defined by the ISO/IEC 7813 standard.

The embodiments described here above in the context of the present invention can be combined with one another. They are given by way of illustratory and non-exhaustive examples in order to illustrate the general principle of the invention as efficiently as possible. Other embodiments can of course be implemented in the context of the present invention. In particular, with the possibility already described of being able to transmit a type of secondary data, it is especially possible to envisage a particular embodiment in which several distinct secondary data are transmitted within a same data stream, each of these secondary data being interposed between two identical sequences of standardized data. Starting with the reception of a single data stream, and on the basis of the types of secondary data identified within the stream, the payment terminal is then capable of initiating numerous processing operations as a complement to a main payment operation, each of these processing operations being adapted to the secondary data processed.

The invention claimed is:

1. A method for transmission of data to a magnetic read head of a payment terminal, said method being implemented by an electronic device capable of generating a magnetic field representative of an encoding of said data, said transmission of data comprising:
   transmitting a plurality of emissions of a same sequence of standardized data, said standardized data being data representative of a payment means and being formatted according to the ISO/IEC 7813 standard, said sequence of standardized data comprising a standardized data sequence start sentinel followed by main data followed by a standardized data sequence end sentinel; and
   transmitting secondary data, said secondary data being emitted between two successive emissions of said sequence of standardized data, said secondary data comprising:
      a predetermined number of characters situated immediately after the standardized data sequence end sentinel of a first of said two successive emissions of said sequence of standardized data, the predetermined number of characters corresponding to a sequence of characters representative of a presence and of a type of said secondary data; and
      at least one character situated immediately after said predetermined number of characters and immediately before the standardized data sequence start sentinel of a second of said two successive emissions of said sequence of standardized data, to be processed as a function of said type of secondary data.

2. The method for the transmission of data according to claim 1 wherein said secondary data comprise at least one piece of data representative of a bank authentication token.

3. The method for the transmission of data according to claim 1 wherein said secondary data comprise at least one loyalty program identifier.

4. A method for processing data received by a magnetic read head of a payment terminal, said method being implemented within said payment terminal and comprising:
   identifying, within a data stream received at said read head, at least two successive sequences of standardized data, said standardized data being data representative of a payment means and being formatted according to the ISO/IEC 7813 standard, said standardized data comprising a standardized data sequence start sentinel followed by main data followed by a standardized data sequence end sentinel;
   determining a presence, within said received data stream, of data, called secondary data, comprised between two successive sequences of standardized data among said at least two preliminarily identified successive sequences of standardized data, said determining comprising:
      reading, within the received data stream, a predetermined number of characters, situated immediately after the standardized data sequence end sentinel of a first of said two successive sequences, delivering a sequence of characters;
      comparing said sequence of characters with at least one piece of reference data, delivering a reference indicator representative of a presence and of a type of said secondary data in case of positive comparison;
   and when the determining a presence delivers a positive result:
      obtaining said secondary data, comprising reading, within the received data stream, at least one character situated immediately after said predetermined number of characters and immediately before the standardized data sequence start sentinel of a second of said two successive sequences; and
      processing said secondary data obtained as a function of said type of said secondary data.

5. The method for processing data according to claim 4, wherein said processing comprises, when said secondary data take the form of at least one authentication token:
   carrying out a cryptographic computation on the basis of said standardized data;

comparing a result of said cryptographic computation with said at least one authentication token, delivering a piece of information on authenticity of said standardized data.

6. The method for processing data according to claim 4, wherein said processing comprises, when said secondary data take the form of at least one loyalty program identifier, transmitting said at least one loyalty program identifier to a loyalty program management server.

7. The method for processing data according to claim 4, wherein said comparing the sequence of characters with at least one piece of reference data comprises comparing the sequence of characters with a plurality of reference data representative of types of secondary data.

8. The method for processing data according to claim 4, wherein the method further comprises:
- obtaining said at least two consecutive identified sequences of standardized data;
- comparing said at least two sequences of standardized data delivering a piece of control information.

9. A payment terminal comprising:
- a magnetic read head; and
- a processing unit configured to:
  - identify, within a data stream received at said read head, at least two successive sequences of standardized data, said standardized data being data representative of a payment means and being formatted according to the ISO/IEC 7813 standard, said standardized data comprising a standardized data sequence start sentinel followed by main data followed by a standardized data sequence end sentinel;
  - determine a presence, within said received data stream, of data called secondary data comprised between two successive sequences of standardized data among said at least two preliminarily identified successive sequences of standardized data, by:
    - reading, within the received data stream, a predetermined number of characters, situated immediately after the standardized data sequence end sentinel of a first of said two successive sequences, delivering a sequence of characters;
    - comparing said sequence of characters with at least one piece of reference data, delivering a reference indicator representative of a presence and of a type of said secondary data in case of positive comparison;
  - obtain said secondary data, comprising reading, within the received data stream, at least one character situated immediately after said predetermined number of characters and immediately before the standardized data sequence start sentinel of a second of said two successive sequences;
  - process said secondary data obtained, as a function of said type of said secondary data.

* * * * *